United States Patent [19]

Tachika et al.

[11] Patent Number: 5,356,989
[45] Date of Patent: Oct. 18, 1994

[54] AQUEOUS DISPERSION

[75] Inventors: Hiroshi Tachika; Keiichiro Togawa; Hiroshi Fujimoto, all of Ohtsu, Japan

[73] Assignee: Toyo Boseki Kabushiki Kaisha, Osaka, Japan

[21] Appl. No.: 183,136

[22] Filed: Jan. 18, 1994

Related U.S. Application Data

[63] Continuation of Ser. No. 898,960, Jun. 12, 1992.

[30] Foreign Application Priority Data

Jun. 13, 1991 [JP] Japan ................... 3-169189

[51] Int. Cl.$^5$ ............... C08J 3/03; C08G 63/20
[52] U.S. Cl. ................... 524/608; 524/601; 524/602; 524/605; 524/607; 524/608; 524/755; 528/272; 528/274; 528/291; 528/295; 528/302; 528/307; 528/308.6; 528/332; 528/336; 528/337; 525/437; 525/438; 525/440; 525/443
[58] Field of Search ........... 524/601, 602, 605, 607, 524/608, 755; 528/272, 274, 291, 295, 302, 307, 308.6, 332, 336, 337; 525/437, 438, 440, 443

[56] References Cited

U.S. PATENT DOCUMENTS

| | | | |
|---|---|---|---|
| 3,546,008 | 12/1970 | Shields et al. | 428/395 |
| 4,304,901 | 12/1981 | O'Neill et al. | 528/290 |
| 4,340,519 | 7/1982 | Kotera et al. | 523/414 |
| 4,910,292 | 3/1990 | Blount | 528/272 |
| 4,963,652 | 10/1990 | Tortorici et al. | 524/604 |

FOREIGN PATENT DOCUMENTS

| | | |
|---|---|---|
| 1816163 | 12/1968 | Fed. Rep. of Germany . |
| 3048159 | 12/1980 | Fed. Rep. of Germany . |
| 47-40873 | 10/1972 | Japan . |
| 50-121336 | 9/1975 | Japan . |
| 58-217546 | 6/1982 | Japan . |
| 61-58092 | 12/1986 | Japan . |

OTHER PUBLICATIONS

Foreign Patent Office search, dated Oct. 12, 1992.

*Primary Examiner*—Samuel A. Acquah
*Attorney, Agent, or Firm*—Leydig, Voit & Mayer, Ltd.

[57] ABSTRACT

An aqueous dispersion suitable for use as various coatings is provided. The dispersion includes polyester resin (A), a water soluble organic compound (B), water (C), and a neutralizer (D). The polyester resin has an acid number of 50 equivalents/$10^6$ g or more. The polycarboxylic acid component of the resin contains aromatic dicarboxylic acid having no metal sulfonate groups in an amount in the range of 50 to 99.99 mole percent, and dicarboxylic acid having a metal sulfonate group in an amount in the range of 0.01 to 20 mole percent based on the total moles of the polycarboxylic acid component. The polyol component of the resin contains diol in an amount in the range of 30 to 100 mole percent based on the total moles of the polyol component. The diol has an alkyl group with 1 to 3 carbon atoms on a side chain, and the total number of carbon atoms in the diol is 6 to 25. The water soluble organic compound has a boiling point in the range of 60° to 250° C. The components (A), (B), and (C) are contained in the dispersion in an amount in the range of 1 to 70 percent by weight, 0 to 69 percent by weight, and 9 to 99 percent by weight, respectively. Further, the components (A), (B), (C), and (D) satisfy the following expressions (1) and (2):

$$B/(B+C) \text{ (weight ratio)} = 0\text{-}0.7 \quad (1)$$

$$D/A \text{ (equivalent ratio)} = 0.1\text{-}20 \quad (2).$$

10 Claims, No Drawings

AQUEOUS DISPERSION

This is a continuation of copending application Ser. No. 07/898,960 filed on Jun. 12, 1992.

BACKGROUND OF THE INVENTION

1. Field of the Invention

The present invention relates to an aqueous dispersion containing polyester resin as a resin component. More particularly, it relates to an aqueous dispersion containing polyester resin suitable for use as a coating for paper, films, steel plates, etc.; various paints for vehicles, cans, etc. including precoat paints; and adhesives.

2. Description of the Prior Art

A large number of organic solvents have been used in the fields of paint; ink; coating; adhesive; and various treatment agents for textiles, paper, and the like. However, increased difficulties have arisen in the use of organic solvents due to a recent trend toward the saving of petroleum resources, prevention of environmental contamination, enforcement of regulations for the discharge of organic solvents such as RACT, restrictions on the use of organic solvents imposed by the amendments of the fire laws, and more rigorous regulations in the concentration of organic solvents in the work environment.

As paint and coatings containing no organic solvents or having low content of organic solvents, there have been proposed paints and coatings of, for example, (i) high solid type, (ii) non-aqueous dispersion type, (iii) aqueous dispersions type, (iv) emulsion type, and (v) solventless type, many of which have already been put into practical use. Among them, those of an aqueous dispersion type are readily handled, thus having widest application, and being in prospect.

Many of the resins contained in the above aqueous dispersion are hydrophobic, which causes the problem of how to make them disperse in water or to maker them water soluble. Further, it is also an important problem that a coating film having high water resistance, corrosion resistance, and weather resistance be obtained by the use of a resin which has been once dispersed or dissolved in water. These problems are true of any resins.

At present, polyester is employed in many cases as the resin contained in the aqueous dispersion mentioned above. As a method for dispersing polyester resin in water or making it water soluble, there are known methods for copolymerizing hydrophilic monomers. For example, there is one known method in which at least one hydrophilic monomer such as diol or dicarboxylic acid containing a metal sulfonate group or polyalkylene glycol is copolymerized with other monomers such as aliphatic dicarboxylic acid. However, all such methods require the use of the hydrophilic monomers mentioned above in large quantities in order to impart excellent solubility or dispersibility in water to the resulting resin, with the result that a coating film formed with a dispersion containing such resin has inferior water resistance and weather resistance.

The use of a combination of a compound containing a metal sulfonate group and polyethylene glycol is disclosed in, for example, Japanese Patent Publication No. 47-40873 and Japanese Laid-Open Patent Publication No. 50-12136. However, since polyester resin containing a large amount of polyethylene glycol has so strong a hydrophilic property that when the resin is used as a binder for printing ink, blocking tends to occur in the printed surfaces due to moisture absorption, making it difficult to use the resin as a binder for printing ink. Similarly, when this polyester resin is used for paint or coating, the resulting coating film absorbs water and moisture, which decreases the adhesion to bases, and causes changes in the appearances of the coating film such as deterioration of gloss, blistering, and a change in the hue, making it impossible to use as a film for the predetermined purpose.

Japanese Patent Publication No. 61-058092 discloses an aqueous dispersion prepared by dispersing polyester resin coating polyalkylene glycol having no aliphatic ether linkages as present in polyethylene glycol, and aromatic dicarboxylic acid containing a metal sulfonate group by use of an amphiphilic solvent. This aqueous dispersion has good dispersibility in water, and a coating film formed with this dispersion has some water resistance. This coating film has enough water resistance so as to serve as a coating film for general use, but does not have high water resistance, or, has interior boiling water resistance. Further, the appearances of the coating film such as the surface smoothness and gloss are not always sufficient. Also, during a coating process, the resin component in paint to be recovered from a coater is partially solidified, and therefore the paint cannot be recovered, or even when recovered, uniform paint cannot be obtained, which causes problems in the working efficiency and productivity.

SUMMARY OF THE INVENTION

The aqueous dispersion of this invention, comprises the following components (A), (B), (C), and (D):

(A) A polyester resin comprising a polycarboxylic acid component and a polyol component, the polycarboxylic acid component containing aromatic dicarboxylic acid having no metal sulfonate groups in an amount in the range of 50 to 99.99 mole percent, and dicarboxylic acid having a metal sulfonate group in an amount in the range of 0.01 to 20 mole percent based on the total moles of the polycarboxylic acid component, the polyol component containing diol in an amount in the range of 30 to 100 mole percent based on the total moles of the polyol component, the diol having an alkyl group with 1 to 3 carbon atoms on a side chain, and the total number of carbon atoms in the diol being 6 to 25, and the polyester resin having an acid number of 50 equivalents/$10^6$ g or more, (B) a water soluble organic compound having a boiling point in the range of 60° to 250° C., (C) water, and (D) a neutralizer;

components (A), (B), and (C) being contained in the dispersion in an amount in the range of 1 to 70 percent by weight, 0 to 69 percent by weight, and 9 to 99 percent by weight, respectively; and components (A), (B), (C), and (D) satisfying the following expressions (1) and (2):

$$B/(B+C) \text{ (weight ratio)} = 0\text{--}0.7 \qquad (1)$$

$$D/A \text{ (equivalent ratio)} = 0.1\text{--}20 \qquad (2)$$

In a preferred embodiment, the polyester resin is amorphous, and has a glass transition temperature in the range of −30° to 80° C.

In a preferred embodiment, the polyester resin has a molecular weight in the range of 2,500 to 30,000, and preferably, 6,000 to 20,000.

In a preferred embodiment, the polyester resin has an acid number in the range of 100 to 250 equivalents/$10^6$ g.

In a preferred embodiment, the polyester resin is an adduct of an acid anhydride.

In a preferred embodiment, the polycarboxylic acid component in the polyester resin contains at least one selected from the group consisting of aliphatic polycarboxylic acid and alicyclic polycarboxylic acid in an amount in the range of 0 to 50 mole percent, and the polyol component in the polyester resin contains at least one selected from the group consisting of aliphatic polyol, alicyclic polyol, and an ethylene oxide adduct of a bisphenol type compound in an amount in the range of 0 to 70 mole percent.

In a preferred embodiment, the dicarboxylic acid having a metal sulfonate group is an aromatic carboxylic acid.

In a preferred embodiment, the aromatic dicarboxylic acid content in the polycarboxylic acid component of the polyester resin is in the range of 60 to 99.9 mole percent.

In a preferred embodiment, the content of the dicarboxylic acid having a metal sulfonate group in the polycarboxylic acid component of the polyester resin is in the range of 0.1 to 2.0 mole percent.

In a preferred embodiment, the equivalent ratio of the neutralizer to the carboxylic acid in the polyester resin is in the range of 1.0 to 2.0.

In a preferred embodiment, the water soluble organic compound is at least one selected from the group consisting of n-butyl cellosolve, n-butyl carbitol, and propylene glycol monomethyl ether.

In a preferred embodiment, the dispersion further comprises at least one selected from the group consisting of amino resin, epoxy resin, and an isocyanate compound as a crosslinking agent.

Thus, the invention described herein makes possible the advantages of (1) providing an aqueous dispersion which is excellent in dispersion stability, transparency, and redispersibility; (2) providing an aqueous dispersion which can form a coating film which is excellent in water resistance, especially boiling water resistance, and appearance; (3) providing an aqueous dispersion having the excellent properties mentioned above which can readily be produced; and (4) providing an aqueous dispersion having the excellent properties mentioned above which is readily handled.

These and other advantages of the present invention will become apparent to those skilled in the art upon reading and understanding the following detailed description.

DESCRIPTION OF THE PREFERRED EMBODIMENTS

Polyester resin for use in an aqueous dispersion of the present invention contains aromatic dicarboxylic acid in an amount in the range of 50 to 99.99 mole percent as a polycarboxylic acid component, and dicarboxylic acid having a metal sulfonate group in an amount in the range of 0.01 to 20 mole percent. The aromatic dicarboxylic acid mentioned above contains no metal sulfonate groups. This polyester contains, if required, other polycarboxylic acids in an amount not exceeding 50 mole percent.

Examples of the above aromatic dicarboxylic acid containing no metal sulfonate groups include terephthalic acid, isophthalic acid, orthophthalic acid, naphthalenedicarboxylic acid, and indenedicarboxylic acid. It is necessary that this aromatic dicarboxylic acid is contained in an amount in the range of 50 to 99.9 mole percent, preferably in an amount in the range of 60 to 99.9 mole percent based on the total moles of the polycarboxylic acid component.

Examples of the dicarboxylic acid containing a metal sulfonate group include a metal salt of sulfoterephthalic acid, 5-sulfoisophthalic acid, 4-sulfonaphthalene-2,7-dicarboxylic acid, 5(4-sulfophenoxy)isophthalic acid, etc. Examples of metal constituting the metal salts include Li, Na, K, Mg, Ca, Cu, and Fe. A more preferable compound is 5-sodium sulfoisophthalic acid. Dicarboxylic acid containing a metal sulfonate group is contained in an amount in the range of 0.01 to 20 mole percent, preferably in an amount in the range of 0.1 to 2.0 mole percent based on the total moles of the polycarboxylic acid components. If the content of the dicarboxylic acid containing a metal sulfonate group exceeds 20 mole percent, the aqueous dispersion containing the polyester resin has too high a viscosity, making it difficult to conduct coating and resulting in a coating film with inferior water resistance.

As the other polycarboxylic acid, aliphatic polycarboxylic acid and/or alicyclic polycarboxylic acid are used. For example, the following polycarboxylic acids can be used: aliphatic dicarboxylic acid such as succinic acid, glutaric acid, adipic acid, azelaic acid, sebacic acid, dodecandioic acid and dimer acid; and alicyclic dicarboxylic acids such as cyclohexane dicarboxylic acid, tetrahydrophthalic acid, and hexahydroisophthalic acid. The above polycarboxylic acid is contained in an amount in the range of 0 to 50 mole percent, preferably in an amount in the range of 0 to 40 mole percent based on the total moles of the polycarboxylic acid component. When the content of the polycarboxylic acid exceeds 50 mole percent, and the content of the aromatic dicarboxylic acid is lower than 50 mole percent, the water resistance and the strength of the resulting coating film are reduced, and the film has tackiness.

As monomers constituting the polyester resin mentioned above, hydroxycarboxylic acids such as p-hydroxybenzoic acid, p-(2-hydroxyethoxy)benzoic acid, hydroxypivalic acid; and lactones such as γ-butyrolactone, ε-caprolacton can be used alone or in combination as required. Trivalent or more-valent polycarboxylic acid such as trimellitic acid and pyromellitic acid can be used in an amount not exceeding 10 mole percent based on the total moles of the carboxylic acid.

The polyol component in the polyester resin for use in the aqueous dispersion of the present invention contains diol having an alkyl group with 1 to 3 carbon atoms on a side chain, and having a total of 6 to 25 carbon atoms in an amount in the range of 30 to 100 mole percent. The polyol component contains, if required, the other glycols in an amount not exceeding 70 mole percent.

Examples of the above polyol having the alkyl group on a side chain include 2-ethyl-2-butylpropanediol, 3-methyl-1,5-pentanediol, 3-ethyl-1,5-pentanediol, 3-propyl-1,5-pentanediol, 3-methyl-1,6-hexanediol, 4-methyl-1,7-heptanediol, 4-methyl-1,8-octanediol, and 4-propyl- 1,8-octanediol. Among them, 3-methyl-1,5-pentanediol and 2-ethyl-2-butylpropanediol are most preferable.

The above diol is used in an amount in the range of 30 to 100 mole percent based on the total moles of the polyol component. When the above diol is used in an amount of less than 30 mole percent, the redispersibility of the resin component deteriorates and the transparency of a coating film obtained by the use of the aqueous dispersion decreases.

The presence of the above diol in polyester resin imparts excellent dispersibility in water not obtainable in the prior art to the polyester resin, resulting in an aqueous dispersion or water soluble varnish having high transparency and low viscosity. Further, the redispersibility of the resin is remarkably excellent. Such good dispersibility of the resin in water is attributable to the fact that the diol molecules have a high degree of freedom in the resin and the alkyl group on the side chain decreases the coagulation property of polymer segments. The transparency of an aqueous dispersion largely affects the appearances of the resulting coating film such as smoothness and gloss. A dispersion containing such a resin is low in viscosity, so that a dispersion with high solid content having an appropriate viscosity can be prepared.

Among propyl components, as the above "the other glycols", aliphatic polyol, alicyclic polyol, and alkylene oxide adduct of bisphenol type compound are used. These compounds have 2 to 25 carbon atoms. Examples of such compounds include ethylene glycol, propylene glycol, 1,3-propanediol, 1,4-butanediol, neopentyl glycol, 1,5-pentanediol, 1,6-hexanediol, dimethylol heptane, dimethylol pentane, diethylene glycol, triethylene glycol, cyclohexane dimethanol, tricyclodecane glycols, polyethylene glycol, polypropylene glycol, polytetramethylene glycol, ethylene oxide adducts or propylene oxide adducts of bisphenol A, ethylene oxide adducts or propylene oxide adducts of bisphenol S, ethylene oxide adducts or propylene oxide adducts of bisphenol F, glycerin, trimethylol propane, and pentaerythritol. The above glycol is contained in an amount not exceeding 70 mole percent based on the total moles of the polyol component.

A polyester resin for use in an aqueous dispersion of the present invention can be prepared in accordance with conventional methods by the use of the above polycarboxylic acid component, polyol component, and, if necessary, the other polycarboxylic acids, polyols, and the like. The acid number of the polyester resin is 50 equivalents/$10^6$ g of more, preferably in the range of 100 to 250 equivalents/$10^6$ g. The acid number represented by equivalent/$10^6$ g used in this specification and the acid number represented by KOH mg/g have the following relationship:

Acid number (KOH mg/g) =

$$\text{Acid number (equivalent/}10^6\text{ g)} \times \frac{56}{1000}$$

when the acid number of the polyester resin thus prepared is small, the introduction of a carboxyl group to the resin by an appropriate method can provide a prescribed acid number. For example, polyester resin obtained by polymerization is subjected to an addition reaction with divalent or more-valent acid anhydride such as trimellitic anhydride or phthalic anhydride under ordinary pressure at a temperature in the range of 200° to 230° C., resulting in a resin having the above desired acid number. Generally, when polyester resin contains a metal sulfonate group in a high concentration, the water resistance of the coating film formed with an aqueous dispersion containing the resin is reduced. However, as mentioned above, the high content of a carboxyl group (the carboxyl group has a hydrophilic property lower than that of the metal sulfonate group) can decrease the metal sulfonate group content, and impart sufficient dispersibility to the resin. When the polyester resin has an acid number of less than 50 equivalents/$10^6$ g, it does not sufficiently disperse in an aqueous solvent.

The polyester resin for use in the present invention preferably has a molecular weight in the range of 2,500 to 30,000, and more preferably, in the range of 7,000 to 25,000. A resin having a molecular weight of less than 2,500 cannot provide a coating film having toughness. On the other hand, a resin having a molecular weight exceeding 30,000 increases the viscosity of the dispersion, or cannot provide a dispersion having high content of polyester resin. A polyester resin with a molecular weight of less than 7,000 has a high degree of hydroxyl value. Therefore, when a dispersion containing such a polyester resin is used as a coating, if the painted portion is folded, the heat durability and boiling water resistance of the folded portion tend to deteriorate. Accordingly, considering the heat durability of the painted portion which is subjected to folding, the hydroxyl value of the resin is preferably 250 equivalents/$10^6$ g or less. If the hydroxyl value exceeds 250 equivalents/$10^6$ g, the heat durability of the folded portion is reduced.

The above-mentioned polyester resin is preferably amorphous, and the glass transition temperature of the resin is preferably in the range of −30° to 80° C., more preferably in the range of −20° to 70° C. When the glass transition temperature is less than −30° C., the aqueous dispersion has tackiness and inferior water resistance. On the other hand, when the glass transition temperature exceeds 70° C., the viscosity of the dispersion increases, deteriorating the coating property thereof.

The polyester resin for use in the present invention can be used alone, or if necessary, in combination of two or more kinds thereof.

The neutralizer contained in the aqueous dispersion of the present invention has a function to neutralize carboxyl groups in the polyester resin, which causes the polyester resin to sufficiently disperse in an aqueous solvent.

Examples of the neutralizer include aqueous ammonia; amines such as methylethanolamine, diethylethanolamine, N-methyldiethanolamine, bis(hydroxypropyl)methylamine, tri-n-butylamine, triethylamine, bis(2-hydroxypropyl)amine, N-methylethanolamine, aminomethylpropanol, 3-amino-1-propanolamine, isopropanolamine, 2-amino-2-hydroxymethyl-1,3-propanediol, aminomethylpropanediol, cyclohexylamine, and t-butylamine; salts of weak acid such as sodium carbonate or potassium carbonate, and strong base; hydroxide of an alkali metal such as sodium hydroxide and potassium hydroxide. When a dispersion containing the nurtralizer is applied, and the resulting coating film is dried or cured, if the neutralizer remains in the film, the remaining neutralizer adversely affects the physical properties of the film, and therefore ammonia and lowboiling amines are preferable such as aqueous ammonia and dimethylethanolamine which volatilize when dried or cured. The content of the neutralizer is prescribed as described below. When the neutralizer content is too low, the carboxyl group does not dissociate and remains in the resin in a dispersion, causing the resin to insufficiently disperse.

Water soluble organic compounds for use in the present invention are used to increase the affinity of the above polyester resin for water (the resin has relatively low affinity for water) and contribute to the dispersibility of the resin in water. The use of a combination of the polyester resin used in the present invention, water soluble organic compounds, and water can provide good aqueous dispersion.

The water soluble organic compounds for use in the present invention have a solubility of 20 g or more in every 1 L of water at a temperature of 20° C. Specific examples of the compounds include aliphatic and alicyclic alcohol, ether, ester and ketone compounds. It is preferable that these water soluble organic compounds have a boiling point in the range of 60° to 250° C. If the boiling point is less than 60° C., it is difficult to maintain a temperature sufficient for mixing, dissolving, or dispersing polyester resin in the organic compound. On the other hand, if the boiling point exceeds 250° C., when an aqueous dispersion containing the organic solvent is coated on a substrate, the resulting coating film cannot have good drying properties.

Examples of the above water soluble organic compound include primary alcohols such as methanol, ethanol, n-propanol, iso-propanol, n-butanol, iso-butanol, sec-butanol, and tert-butanol; glycols such as ethylene glycol and propylene glycol; ethylene glycol alkyl ethers such as methyl cellosolve, ethyl cellosolve, and n-butyl cellosolve and acetates thereof; diethylene glycol alkyl ethers such as ethyl carbitol and n-butyl carbitol, and acetates thereof; propylene glycol alkyl ethers and acetates thereof; ethers such as dioxane and tetrahydrofuran; esters such as ethyl acetate; and ketones such as methyl ethyl ketone, cyclohexanone, cyclooctanone, cyclodecanone, and isophorone. Most preferable are glycol ethers with 6 or more carbon atoms containing a butyl group such as n-butyl cellosolve, n-butyl carbitol, or the like. These water soluble organic compounds can be used alone, or in combination of two or more kinds thereof.

The aqueous dispersion of the present invention contains (A) polyester resin, (B) water soluble organic compounds, (C) water, and (D) a neutralizer each in prescribed amounts. The each content of the components A, B, and C in the dispersion is in an amount in the range of 1 to 70 percent by weight, 0 to 69 percent by weight, and 9 to 99 percent by weight.

Components (A), (B), (C), and (D) satisfies the following expressions (1) and (2):

$$B/(B+C) \text{ (weight ratio)} = 0-0.7 \quad (1)$$

$$D/A \text{ (equivalent ratio)} = 0.1-20 \quad (2)$$

When the content of the polyester resin (A) is less than 1 percent by weight, the viscosity of the aqueous dispersion containing the resin is too low, so that cissing tends to occur in the process for applying the aqueous dispersion. On the contrary, when the content of the resin (A) exceeds 70 percent by weight, the viscosity is too high, so that the resulting dispersion cannot be applied uniformly.

When the content of the water soluble organic compound (B) is 70 percent by weight of less based on the total weight of the components (B) and (C), preferably in the range of 5 to 70 percent by weight in the above expression (1), a dispersion having good dispersibility in water and high transparency can be obtained. Further, since the dispersion has excellent coating properties, the appearance of the resulting coating film is excellent. When the content of the compound (B) exceeds 70 percent by weight, there arise problems such as lower flash point of the aqueous dispersion.

As shown in the expression (2), the equivalent ratio of the neutralizer (D) to the carboxyl group in the polyester resin (A) is in the range of 0.1 to 20, preferably in the range of 1.0 to 2.0. When the ratio is less than 0.1, the carboxyl group of the resin cannot sufficiently dissociate, preventing the resin from sufficiently dispersing in water. On the other hand, when the ratio exceeds 20, the neutralizer remains in the resulting coating film after being dried, reducing the water resistance of the film, and causing the polyester resin to hydrolyze with time during the storage of the aqueous dispersion.

If necessary, the aqueous dispersion of the present invention further contains additives such as crosslinking agents, pigments, dyes, antioxidants, etc. For example, the crosslinking agent is at least one compound selected from the group consisting of amino resin, epoxy compound, and isocyanate compound as a crosslinking agent. This crosslinking agent is allowed to react with the functional group contained in the polyester (e.g., melamine reacts with a carboxyl group), thereby increasing the water resistance of the coating film formed with the dispersion. The additives can be contained in the dispersion in an amount of 200 parts by weight or less for every 100 parts by weight of the polyester resin.

Examples of the amino resin include formaldehyde adducts of compounds such as urea, melamine, and benzoguanamine; and alkyl ether compounds prepared by adding an alcohol with 1 to 6 carbon atoms thereto. Specific examples include methylated methylolurea, methylated methylol N, N-ethyleneurea, methylated methyloldicyanediamide, methylated methylol melamine, methylated methylol benzoguanamine, butylated methylol melamine, butylated methylol benzoguanamine. Among them, methylated methylol melamine, butylated methylol melamine, and butylated methylol benzoguanamine are preferable. These amino resins can be used alone or in combination thereof.

Examples of epoxy compound include diglycidyl ether of bisphenol A and oligomers thereof, diglycidyl ether of hydrogenated bisphenol A and oligomers thereof, orthophthalic acid diglycidyl ester, isophthalic acid diglycidyl ester, terephthalic acid diglycidyl ester, p-oxybenzoic acid diglycidyl ester, tetrahydrophthalic acid diglycidyl ester, hexahydrophthalic acid diglycidyl ester, succinic acid diglycidyl ester, adipic acid diglycidyl ester, sebacic acid diglycidyl ester, ethylene glycol diglycidyl ether, propylene glycol diglycidyl ether, 1,4-butanediol diglycidyl ether, 1,6-hexanediol diglycidyl ether, polyalkylene glycol diglycidyl ether, trimellitic acid triglycidyl ester, triglycidyl isocyanurate, 1,4-diglycidyl oxybenzene, diglycidyl propyleneurea, glycerol triglycidyl ether, trimethylol ethane triglycidyl ether, trimethylol propane triglycidyl ether, pentaerythritol tetraglycidyl ether, and triglycidyl ether of glycerol alkylene oxide adducts.

As an isocyanate compound, aromatic or aliphatic diisocyanate, and trivalent or more-valent polyisocyanate can be used. As an isocyanate compound, either low molecular weight or high molecular weight compounds may be used. Examples of the isocyanate compound include tetramethylene diisocyanate, hexamethylene diisocyanate, toluene diisocyanate, diphenylmethane diisocyanate, xylylene diisocyanate, hydrogenated xylylene diisocyanate, isophorone diisocyanate, or the trimer thereof. Further, included are isocyanate-terminated compounds obtained by reacting an excess amount of these isocyanate compounds with low molecular active hydrogen compounds; high molecular active hydrogen compounds such as various polyester polyols, polyether polyols, and polyamides; and the like. Examples of the above low molecular active compound include ethylene glycol, propylene glycol, trimethylol propane, glycerin, sorbitol, ethylenediamine, monoethanolamine, diethanolamine and triethanolamine.

The isocyanate compound can be blocked isocyanate. Examples of the blocking agent of isocyanate include phenols such as phenol, thiophenol, methylthiophenol, ethylthiophenol, cresol, xylenol, resorcinol, nitrophenol and chlorophenol; oximes such as acetoxime, methyl ethyl ketoxime and cyclohexanone oxime; primary alcohols such as methanol, ethanol, propanol and butanol; halogen-substituted alcohols such as ethylenechlorohydrin and 1,3-dichloro-2-propanol; tertiary alcohols such as t-butanol, and t-pentanol; and lactams such as ε-caprolactam, δ-valerolactam, γ-butyrolactam and β-propyllactam. In addition, preferable are aromatic amines; imides; active methylene compounds such as acetylacetone, acetoacetic acid esters, and malonic acid ethyl ester; mercaptans; imines; ureas; diaryl compounds; and sodium bisulfite. Blocked isocyanate can be obtained by effecting the addition reaction between the above isocyanate compound and the above blocking agent in accordance with an appropriate known method.

The aqueous dispersion of the present invention contains the above polyester resin, water soluble organic compound, neutralizer, and if necessary, additives such as the above crosslinking agent, a curing agent, reaction accelerator, pigment, dye, etc., in water in the uniform state. The method for the production of the dispersion is not particularly limited, and one example of the method is described below.

First, polyester resin (A) and a water soluble organic compound (B) are premixed at a temperature in the range of 50° to 200° C. to dissolve the resin. Then, water (C) with a neutralizer (D) being dissolved therein is added to the mixture. Alternatively, water (C) with a neutralizer (D) being dissolved therein is added to the mixture of (A) and (B), after which the mixture is stirred at a temperature in the range of 40° to 120° C.

A crosslinking agent such as amino resin, epoxy resin, or isocyanate resin can be added in an appropriate step in the above process. For example, the crosslinking agent can be added directly to the polyester resin, or added to the mixture of the polyester resin and water soluble organic compound, or to a solution prepared by heating the mixture. Alternatively, the crosslinking agent can be added to the mixture of polyester resin, water soluble organic compound, and water. The crosslinking agent and polyester resin can be allowed to partially react with each other, resulting in a material for the aqueous dispersion. The suitable mixing method is selected according to the kinds of components contained in the aqueous dispersion, for example, the kind of polyester resin and the crosslinking agent.

The aqueous dispersion of the present invention is useful for various coatings, binder, paint, and adhesive, and further treatment agents for textiles and paper. Since the aqueous dispersion of the present invention has transparency, the resulting coating film has excellent appearance, and the dispersion is preferably used as paint and precoat paint for coating (the in-line coating or off-line coating of a plastic film).

The above aqueous dispersion has a prescribed acid number, or a prescribed content of a carboxyl group. The carboxyl group is neutralized by a neutralizer, or dissociated, and therefore, the polyester resin sufficiently disperses in an aqueous solvent. Accordingly, even when the content of a metal sulfonate group is low, the polyester resin has sufficient dispersibility. The metal sulfonate group content of the polyester resin is low, so that the resulting coating film has excellent water resistance and boiling water resistance. If the neutralizer is a volatile material, when the aqueous dispersion is applied, and the resulting film is dried, the neutralizer is removed from the film. In such a case, the carboxylic acid which has formed a salt with the neutralizer returns to the free state, so that the resulting coating film has excellent water resistance and boiling water resistance.

Since the aqueous dispersion is present in a uniform state, the coating process is easy. For example, the process for coating a sheet or film with the dispersion as paint by means of a coater is readily conducted, and the extra paint is present in a uniform state without being partially solidified, and therefore it can be readily recovered. The recovered paint can be redispersed to be recycled in the same manner as conventional solvent-type paints.

Since the aqueous dispersion of the present invention has low viscosity, it can be applied by spray coating which has been difficult with solvent-type polymer polyester. It is also possible to obtain a dispersion having a high content of polyester resin.

EXAMPLES

The present invention is described by reference to examples below. Hereinafter, the term "parts" refers to "parts by weight". The polyester resin and aqueous dispersion obtained in the following examples and comparative examples were evaluated in accordance with the following test method.

(1) Molecular weight

Polyester resin samples (a) to (p) described below were measured for the number average molecular weight in accordance with GPC (gel permeation chromatography) by the use of polystyrene as a standard.

(2) Acid number

The polyester resin samples (a) to (p) were weighted out accurately each in an amount of 0.2 g, and dissolved in 20 ml of chloroform, after which each solution was titrated with a solution of 0.01N potassium hydroxide in ethanol to calculate the acid number based on the measured value. Phenolphthalein was used as an indicator.

(3) Hydroxyl value

Hydroxyl value of each of the polyester resin samples (a) to (p) was calculated according to the composition, molecular weight, and acid number of the resin sample.

(4) Glass transition temperature

The polyester resin samples (a) to (p) were put in a container with an aluminum pressure lid each in an amount of 5 mg, and crimped so as to be used as a sample. Each sample was measured for the glass transition temperature by means of a differential scanning calorimeter (DSC) at an increasing temperature rate of 20° C./min.

(5) Transparency

The aqueous dispersion samples obtained in the following examples were visually evaluated. An aqueous dispersion having a solid content (polyester content) exceeding 30 percent by weight was diluted by the use of a mixture of a water soluble organic solvent (B) and water (C) with the same weight ratio as that contained in the dispersion to a solid content of 30 percent by weight, and then visually evaluated.

⊙: Translucent,
○: Transparent milky white tint,
Δ: Opaque milky white tint,
×: Gelling when dispersed, fault in dispersion (6) Dispersion stability The aqueous dispersion samples obtained in the following examples were stored at ordinary temperature for one month, after which the stored dispersions were visually evaluated.

○: Good,
Δ: Once precipitating but redispersed by stirring,
×: Separating, and gelled,
××: Fault in dispersion when being prepared (7) Redispersibility First, 5 percent by weight of each aqueous dispersion obtained in the following examples was spread over a glass plate, and air-dried for 12 hours. Then, the obtained film was removed and returned to the original aqueous dispersion to test if it would uniformly redisperse.

○: Good,
Δ: Partially dispersing,
×: not dispersing (8) Water resistance

First, to 100 parts (solid content) of each aqueous dispersion obtained in the following examples, added were 25 parts (solid content) of a melamine solution (Sumimal M30W, manufactured by Sumitomo Chemical Co., Ltd.), 0.25 parts (solid content) of paratoluene sulfonate solution as catalyst, 100 parts of titanium oxide, and 250 parts of glass beads, after which the mixture was shook by means of a paint shaker for 5 hours to be dispersed. Then, the resulting dispersion was applied onto a zinc plate so that the thickness of dried film was 15 μm, and the film was baked at 230° C. for 1 minute. The resulting coated plate was boiled in boiling water for 2 hours to determine the gloss retention (%). The gloss retention was calculated by the following expression. The surface gloss was evaluated by measuring reflected light at an angle of 60° by the use of Gloss meter TC-108D (manufactured by Tokyo Denshoku Co., Ltd.).

Gloss retention (%)=(post-treatment gloss/initial gloss)×100

(9) The appearance of a coating film

Each coating film formed with the aqueous dispersions obtained in the following examples was visually evaluated for appearance.

○: Good,
×: Remarkable cissing or partial agglomerate in the film

(10) Heat durability of the coated plate at the folded portion

Three coated plates prepared in the above process for evaluating the water resistance (8) were successively superposed one on the other. Then, the laminated coated plates were folded with the coated surface thereof outside at 25° C., after which the folded plates were put into boiling water, and boiled therein for 2 hours to evaluate the appearance at the folded portion.

○: No cracks,
×: Noticeable cracks

Synthesis of Polyester Resin (a)

First, a one liter flask was charged with 194 parts of dimethyl terephthalate, 162 parts of dimethyl isophthalate, 3.8 parts of trimellitic anhydride, 472 parts of 3-methyl-1,5-pentanediol, 1.2 parts of 3,5-sodium dicarbomethoxybenzene sulfonate, and 0.20 parts of titanium butoxide, and the mixture was gradually heated to a temperature of 230° C. over 4 hours to effect transesterification. Then, the mixture was cooled to a temperature of 180° C., and the flask was further charged with 20 parts of sebacic acid, and the mixture was gradually heated to a temperature of 230° C. over 3 hours to effect esterification. Then, the atmospheric pressure of the mixture was gradually reduced to 10 mmHg over 30 minutes to effect primary polymerization, after which the mixture was heated to a temperature of 250° C. to conduct secondary polymerization under a pressure not exceeding 1 mmHg for 60 minutes. After polymerization, the mixture was cooled to a temperature of 200° C. under a stream of nitrogen, and the flask was further charged with 7.7 parts of trimellitic anhydride. Then, the mixture was heated to a temperature of 230° C. over one hour to effect the addition reaction, resulting in a light yellow resin.

The polyester resin (a) thus obtained was subjected to an analysis by NMR. The results indicate that the molar ratios of the acid components and the glycol components are as follows: terephthalic acid/isophthalic acid/sebacic acid/trimellitic acid/5-sodium sulfoisophthalate/trimellitic acid (added after polymerization)=50/41.8/5/1/0.2/2; 3-methyl-1,5-pentanediol=100. According to GPC measurement, the number average molecular weight (Mn) is 8,700, the acid number is 172 equivalents/$10^6$ g, and the glass transition temperature is 2° C.

Synthesis of Polyester Resin Samples (b) to (p)

Polyester resin samples (b) to (p) having composition as shown in Tables 1 to 2 were synthesized in the same manner as in the synthesis of the polyester resin (a). The polyester resin samples (h) to (p) are comparative samples having a composition other than that of the polyester resin used in the present invention.

TABLE 1

| Resin sample | a | b | c | d | e | f | g |
|---|---|---|---|---|---|---|---|
| Resin components (molar ratio) | | | | | | | |
| Polycarboxylic acid | | | | | | | |
| Terephthalic acid | 50 | 50 | 50 | 50 | 50 | 60 | 60 |
| Isophthalic acid | 41.8 | 41.8 | 47 | 46 | 42 | 36 | 47 |

TABLE 1-continued

| Resin sample | a | b | c | d | e | f | g |
|---|---|---|---|---|---|---|---|
| Trimellitic acid | 1 | 1 | — | — | 3 | — | — |
| 5-sodium sulfoisophthalate | 0.2 | 0.2 | 1 | 2 | 1 | 2 | 1 |
| Sebacic acid | 5 | 5 | — | — | — | — | — |
| Trimellitic acid (added after polymerization) | 2 | 2 | 2 | 2 | 2 | 2 | 2 |
| Polyol | | | | | | | |
| MPD[1)] | 100 | 100 | 100 | 40 | 40 | 55 | 80[2)] |
| Ethylene glycol | — | — | — | — | 18 | — | 20 |
| Neopentyl glycol | — | — | — | 60 | 42 | — | — |
| 1,6-Hexanediol | — | — | — | — | — | 45 | — |
| Diethylene glycol | — | — | — | — | — | — | — |
| Resin properties | | | | | | | |
| Molecular weight (Mn) | 8,700 | 3,500 | 16,200 | 7,500 | 6,800 | 13,500 | 12,000 |
| Acid number (equivalents/$10^6$ g) | 172 | 170 | 168 | 165 | 352 | 175 | 170 |
| Hydroxyl value (equivalents/$10^6$ g) | 194 | 251 | 39 | 184 | 268 | 60 | 82 |
| Glass transition point (°C.) | 2 | 0 | 8 | 35 | 34 | 0 | 21 |

[1)]3-Methyl-1,5-pentandiol (manufactured by Kuraray Co. Ltd.)
[2)]2-Ethyl-2-butyl propanediol

TABLE 2

| Resin sample | h* | i* | j* | k* | l* | m* | n* | o* | p* |
|---|---|---|---|---|---|---|---|---|---|
| Resin components (molar ratio) | | | | | | | | | |
| Polycarboxylic acid | | | | | | | | | |
| Terephthalic acid | 50 | 50 | 50 | 50 | 60 | — | 50 | 50 | 50 |
| Isophthalic acid | 42 | 50 | 49 | 46 | 29 | 41 | 46 | 45 | 46 |
| Trimellitic acid | 1 | — | — | — | — | 1 | — | — | — |
| 5-sodium sulfoisophthalate | — | — | 1 | 4 | 21 | 1 | 2 | 3 | 2 |
| Sebacic acid | 5 | — | — | — | — | 55 | — | — | — |
| Trimellitic acid (added after polymerization) | 2 | — | — | — | — | 2 | 2 | 2 | 2 |
| Polyol | | | | | | | | | |
| MPD[1)] | 100 | 100 | 100 | 100 | 100 | 100 | 28 | — | — |
| Ethylene glycol | — | — | — | — | — | — | — | 50 | — |
| Neopentyl glycol | — | — | — | — | — | — | 72 | 50 | — |
| 1,6-Hexanediol | — | — | — | — | — | — | — | — | — |
| Diethylene glycol | — | — | — | — | — | — | — | — | 100 |
| Resin properties | | | | | | | | | |
| Molecular weight (Mn) | 9,500 | 12,200 | 9,800 | 13,600 | 13,500 | 18,000 | 12,000 | 18,200 | 6,800 |
| Acid number (equivalents/$10^6$ g) | 178 | 25 | 17 | 20 | 8 | 150 | 170 | 180 | 163 |
| Hydroxyl value (equivalents/$10^6$ g) | 172 | 139 | 187 | 127 | 140 | 86 | 82 | 20 | 212 |
| Glass transition point (°C.) | 2 | 7 | 5 | 7 | 8 | −30 | 43 | 67 | 22 |

[1)]3-Methyl-1,5-pentandiol (manufactured by Kuraray Co. Ltd.)
*Comparative polyester resin sample

EXAMPLE 1

First, a one liter flask was charged with 30 parts of polyester resin (a), 21 parts of butyl carbitol (water soluble organic compound), 0.8 parts of 28% aqueous ammonia, and 49 parts of water. Then, the mixture was stirred at a temperature of 80° C. over 3 hours to obtain a dispersion. The aqueous dispersion thus prepared is stable even at ordinary temperature, and good translucent dispersion. This aqueous dispersion was tested for redispersibility, and found to have good redispersibility.

Next, the dispersion was tested for water resistance, and neither blister nor reduction in gloss was not observed. Further, the dispersion had high transparency, and the coating film formed with the dispersion had good appearance such as gloss and smoothness. The results are shown in Table 3.

EXAMPLES 2 to 10

To each of the polyester resin samples (b) to (g), a water soluble organic compound, water, aqueous ammonia, and dimethylethanolamine were mixed with the ratio as shown in Table 3 in the same manner as in Example 1 to provide an aqueous dispersion. The resulting aqueous dispersions (b) to (g) were evaluated in the same manner as in Example 1. The results were shown in Table 3.

TABLE 3

| | | Examples | | | | | | | | | |
|---|---|---|---|---|---|---|---|---|---|---|---|
| | | 1 | 2 | 3 | 4 | 5 | 6 | 7 | 8 | 9 | 10 |
| (A) | Polyester resin | a | b | c | c | c | c | d | e | f | g |
| | parts | 30 | 30 | 30 | 40 | 30 | 30 | 30 | 30 | 35 | 30 |
| (B) | Butyl carbitol (parts) | 21 | 21 | — | 12 | 14 | — | 21 | — | 13 | — |
| | Butyl cellosolve (parts) | — | — | 21 | — | — | — | — | 21 | — | 21 |
| | Propylene glycol monoethylether (parts) | — | — | — | — | — | 21 | — | — | — | — |

TABLE 3-continued

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| (C) | Water (parts) | 49 | 49 | 49 | 48 | 56 | 49 | 49 | 49 | 52 | 49 |
| (D) | 28% Aqueous ammonia (parts) | 0.8 | 0.8 | 0.8 | — | 0.8 | — | 0.8 | 0.7 | — | 0.8 |
|  | Dimethylethanolamine (parts) | — | — | — | 0.6 | — | 0.5 | — | — | 0.6 | — |
| Components | A/B/C (weight ratio) | 30/21/49 | 30/21/49 | 30/21/49 | 40/12/48 | 30/14/56 | 30/21/48 | 30/21/49 | 30/21/49 | 35/13/52 | 30/21/49 |
|  | B/(B + C) (weight ratio) | 0.3 | 0.3 | 0.3 | 0.2 | 0.2 | 0.3 | 0.3 | 0.3 | 0.2 | 0.3 |
|  | D/A (equivalent ratio) | 1.2 | 1.2 | 1.2 | 1.0 | 1.2 | 1.2 | 1.2 | 0.5 | 1.0 | 1.2 |
| Test results | Dispersion stability | ○ | ○ | ○ | ○ | ○ | ○ | ○ | ○ | ○ | △ |
|  | Transparency | ⊙ | ⊙ | ⊙ | ⊙ | ⊙ | ⊙ | ○ | ○ | ○ | ○ |
|  | Redispersibility | ○ | ○ | ○ | ○ | ○ | ○ | ○ | ○ | ○ | △ |
|  | Water resistance (gloss retention) (%) | 95 | 85 | 93 | 95 | 95 | 96 | 90 | 92 | 94 | 97 |
|  | Appearances | ○ | ○ | ○ | ○ | ○ | ○ | ○ | ○ | ○ | ○ |
|  | Heat durability of folded portion | ○ | x | ○ | ○ | ○ | ○ | ○ | x | ○ | ○ |

COMPARATIVE EXAMPLES 1 TO 12

Each of polyester resin samples (a), (c), and (h) to (p), water soluble organic compound, water, aqueous ammonia, and dimethylethanolamine were mixed with the ratio as shown in Table 4 or 5 to provide an aqueous dispersion. The resulting aqueous dispersion for each was evaluated in the same manner as in Example 1. The results are shown in Table 4 or 5.

As apparent from Tables 3 to 5, the aqueous dispersion of the present invention is excellent in dispersion stability, transparency, and redispersibility. The coating film formed with the dispersion has good appearance such as gloss, pigment dispersibility, hue stability, and smoothness. Furthermore, the film has good water resistance, especially to boiling water.

Various other modifications will be apparent to and can be readily made by those skilled in the art without departing from the scope and spirit of this invention. Accordingly, it is not intended that the scope of the claims appended hereto be limited to the description as

TABLE 4

|  |  | Comparative examples | | | | | |
|---|---|---|---|---|---|---|---|
|  |  | 1 | 2 | 3 | 4 | 5 | 6 |
| (A) | Polyester resin | a | c | c | h* | i* | j* |
|  | parts | 30 | 30 | 40 | 30 | 30 | 30 |
| (B) | Butyl carbitol (parts) | 21 | — | 12 | 14 | — | — |
|  | Butyl cellosolve (parts) | — | 56 | — | — | — | 14 |
|  | Propylene glycol monoethylether (parts) | — | — | — | — | 21 | — |
| (C) | Water (parts) | 49 | 14 | 48 | 56 | 49 | 56 |
| (D) | 28% Aqueous ammonia (parts) | — | 0.8 | — | 0.8 | — | 0.1 |
|  | Dimethylethanolamine (parts) | — | — | — | — | 0.1 | — |
| Components | A/B/C (weight ratio) | 30/21/49 | 30/56/14 | 40/12/48 | 30/14/56 | 30/21/48 | 30/14/56 |
|  | B/(B + C) (weight ratio) | 0.3 | 0.8 | 0.2 | 0.2 | 0.3 | 0.2 |
|  | D/A (equivalent ratio) | 0 | 1.2 | 0 | 1.2 | 1.7 | 1.5 |
| Test results | Dispersion stability | xx | ○ a) | xx | x | xx | xx |
|  | Transparency | x | ⊙ | x | x | x | x |
|  | Redispersibility | x | △ | x | △ | x | x |
|  | Water resistance (gloss retention) (%) | — | 78 | — | 97 | — | — |
|  | Appearances | — | x | — | x | — | — |
|  | Heat durability of folded portion | — | — | — | — | — | — |

*Comparative polyester resin sample
a) Paste

TABLE 5

|  |  | Comparative examples | | | | | |
|---|---|---|---|---|---|---|---|
|  |  | 7 | 8 | 9 | 10 | 11 | 12 |
| (A) | Polyester resin | k* | l* | m* | n* | o* | p* |
|  | parts | 30 | 30 | 35 | 30 | 30 | 35 |
| (B) | Butyl carbitol (parts) | 14 | 14 | — | 21 | — | 13 |
|  | Butyl cellosolve (parts) | — | — | 20 | — | 21 | — |
|  | Propylene glycol monoethylether (parts) | — | — | — | — | — | — |
| (C) | Water (parts) | 56 | 56 | 45 | 49 | 49 | 52 |
| (D) | 28% Aqueous ammonia (parts) | 0.1 | 0.05 | 0.5 | 0.8 | 0.8 | — |
|  | Dimethylethanolamine (parts) | — | — | — | — | — | 0.6 |
| Components | A/B/C (weight ratio) | 30/14/56 | 30/14/56 | 35/20/45 | 30/21/49 | 30/21/49 | 36/13/52 |
|  | B/(B + C) (weight ratio) | 0.2 | 0.2 | 0.3 | 0.3 | 0.3 | 0.2 |
|  | D/A (equivalent ratio) | 1.5 | 1.5 | 1.0 | 1.2 | 1.2 | 1.0 |
| Test results | Dispersion stability | ○ | ○ | ○ | x | x | x |
|  | Transparency | ⊙ | ⊙ | ⊙ | x | x | x |
|  | Redispersibility | ○ | ○ | ○ | △ | x | x |
|  | Water resistance (gloss retention) (%) | 37 | (Peeling) | (Peeling) | 75 | 78 | 65 |
|  | Appearances | ○ | ○ | ○ | x | x | x |
|  | Heat durability of folded portion | x | x | x | — | — | — |

*Comparative polyester resin sample
a) Paste

What is claimed is:

1. An aqueous dispersion comprising the following components (A), (B), (C), and (D):
   (A) a polyester resin comprising a polycarboxylic acid component and a polyol component,
   the polycarboxylic acid component containing aromatic dicarboxylic acid having no metal sulfonate groups in an amount in the range of 50 to 99.99 mole percent, and dicarboxylic acid having a metal sulfonate group in an amount in the range of 0.01 to 2 mole percent based on the total moles of the polycarboxylic acid component,
   the polyol component containing diol in an amount in the range of 30 to 100 mole percent based on the total moles of the polyol component, the diol having an alkyl group with 1 to 3 carbon atoms on a side chain, and the total number of carbon atoms in the diol being 6 to 25, and
   the polyester resin having a number average molecular weight in the range of 6,000 to 30,000 and having an acid number of 50 equivalents/$10^6$ g or more, wherein said acid number of said polyester resin is achieved by an addition reaction of a polyester resin with an acid anhydride,
   (B) a water soluble organic compound having a boiling point in the range of 60° to 250° C.,
   (C) water, and
   (D) a neutralizer;
   components (A), (B), and (C) being contained in the dispersion in an amount in the range of 1 to 70 percent by weight, 0 to 69 percent by weight, and 9 to 99 percent by weight, respectively, and
   components (A), (B), (C), and (D) satisfying the following expressions (1) and (2):

$B/(B+C)$ (weight ratio)=0–0.7      (1)

$D/A$ (equivalent ratio) 0.1–20      (2).

2. An aqueous dispersion according to claim 1, wherein the polyester resin is amorphous, and has a glass transition temperature in the range of −30° to 80° C.

3. An aqueous dispersion according to claim 2, wherein the polyester resin has an acid number in the range of 100 to 250 equivalents/$10^6$ g.

4. An aqueous dispersion according to claim 1, wherein the polycarboxylic acid component in the polyester resin contains at least one selected from the group consisting of aliphatic polycarboxylic acid and alicyclic polycarboxylic acid in an amount in the range of 0 to 50 mole percent, and the polyol component in the polyester resin contains at least one selected from the group consisting of aliphatic polyol, alicyclic polyol, ethylene oxide adducts or propylene oxide adducts of bisphenol A, ethylene oxide adducts or propylene oxide adducts of bisphenol S, and ethylene oxide adducts or propylene oxide adducts of bisphenol F in an amount in the range of 0 to 70 mole percent.

5. An aqueous dispersion according to claim 1, wherein the dicarboxylic acid having a metal sulfonate group is an aromatic carboxylic acid.

6. An aqueous dispersion according to claim 2, wherein the aromatic dicarboxylic acid content in the polycarboxylic acid component of the polyester resin is in the range of 60 to 99.9 mole percent.

7. An aqueous dispersion according to claim 6, wherein the content of the dicarboxylic acid having a metal sulfonate group in the polycarboxylic acid component of the polyester resin is in the range of 0.1 to 2.0 mole percent.

8. An aqueous dispersion according to claim 7, wherein the equivalent ratio of the neutralizer to the carboxylic acid in the polyester resin is in the range of 1.0 to 2.0.

9. An aqueous dispersion according to claim 1, wherein the water soluble organic compound is at least one selected from the group consisting of n-butyl cellosolve, n-butyl carbitol, and propylene glycol monomethyl ether.

10. An aqueous dispersion according to claim 1, wherein said diol is 3-methyl-1,5-pentanediol.

* * * * *

UNITED STATES PATENT AND TRADEMARK OFFICE
CERTIFICATE OF CORRECTION

PATENT NO. : 5,356,989

DATED : OCTOBER 18, 1994

INVENTOR(S) : HIROSHI TACHIKA, KEIICHIRO TOGAWA AND HIROSHI FUJIMOTO

It is certified that error appears in the above-identified patent and that said Letters Patent is hereby corrected as shown below:

Column 1, line 40, delete "maker" and substitute therefor -- make --;

Column 1, line 67, delete "50-12136" and substitute therefor -- 50-121336 --;

Column 2, line 14, delete "coating" and substitute therefor -- containing --;

Column 2, line 17, after "group by" insert -- the --;

Column 2, line 22, delete "interior" and substitute therefor -- inferior --;

Column 5, line 26, delete "propyl" and substitute therefor -- polyol --;

Column 5, line 50, delete "of" and substitute therefor -- or --;

Column 6, line 64, delete "nurtralizer" and substitute therefor -- neutralizer --;

Column 8, line 2, delete "of" and substitute therefor -- or --;

Column 9, line 6, before "xylylene diisocyanate," insert -- hydrogenated diphenylmethane diisocyanate --;

Column 10, line 66, delete "pressure" and substitute therefor -- presser --;

Column 12, line 57, delete "to" and substitute therefor -- and --;

UNITED STATES PATENT AND TRADEMARK OFFICE
CERTIFICATE OF CORRECTION

PATENT NO. : 5,356,989
DATED : OCTOBER 18, 1994
INVENTOR(S) : HIROSHI TACHIKA, KEIICHIRO TOGAWA AND HIROSHI FUJIMOTO

It is certified that error appears in the above-indentified patent and that said Letters Patent is hereby corrected as shown below:

Columns 11 and 12, Table 1, column g, line 4, delete "60" and substitute therefor -- 50 --;

Columns 13 and 14, Table 3, line 4, insert parentheses around the word "parts";

Columns 15 and 16, Table 3-continued, column 6, line 7, delete "48" and substitute therefor -- 49 --;

Columns 15 and 16, Table 4, line 4, insert parentheses around the word "parts";

UNITED STATES PATENT AND TRADEMARK OFFICE
CERTIFICATE OF CORRECTION

PATENT NO. : 5,356,989
DATED : OCTOBER 18, 1994
INVENTOR(S) : HIROSHI TACHIKA, KEIICHIRO TOGAWA AND HIROSHI FUJIMOTO

It is certified that error appears in the above-indentified patent and that said Letters Patent is hereby corrected as shown below:

Columns 15 and 16, Table 4, column 5, line 11, delete "48" and substitute therefor -- 49 --; and Columns 15 and 16, Table 5, line 4, insert parentheses around the word "parts".

Signed and Sealed this

Eleventh Day of April, 1995

*Attest:*

BRUCE LEHMAN

*Attesting Officer*   *Commissioner of Patents and Trademarks*